United States Patent
Fuerstner et al.

(10) Patent No.: US 9,331,366 B2
(45) Date of Patent: May 3, 2016

(54) BATTERY ARRANGEMENT AND METHOD FOR COOLING A BATTERY

(71) Applicant: Dr. Ing. h.c. F. Porsche Aktiengesellschaft, Stuttgart (DE)

(72) Inventors: Michael Fuerstner, Gerlingen (DE); Bjoern Pehnert, Tamm (DE); Thierry Mingers, Sospel (FR); Hermann Dibos, Remchingen (DE); Gianluca Belogi, Winnenden (DE); Rolf Weyrauch, Untergruppenbach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 134 days.

(21) Appl. No.: 14/097,863

(22) Filed: Dec. 5, 2013

(65) Prior Publication Data

US 2014/0162106 A1    Jun. 12, 2014

(30) Foreign Application Priority Data

Dec. 7, 2012   (DE) .......................... 10 2012 111 970

(51) Int. Cl.
*H01M 10/613* (2014.01)
*H01M 10/625* (2014.01)
*H01M 10/6567* (2014.01)
*H01M 2/10* (2006.01)
*H01M 10/6553* (2014.01)
*B60L 11/18* (2006.01)

(52) U.S. Cl.
CPC ....... *H01M 10/5004* (2013.01); *B60L 11/1874* (2013.01); *B60L 11/1879* (2013.01); *H01M 2/1077* (2013.01); *H01M 10/5016* (2013.01); *H01M 10/5075* (2013.01); *H01M 10/613* (2015.04); *H01M 10/625* (2015.04); *H01M 10/6553* (2015.04); *H01M 10/6567* (2015.04); *B60L 2240/545* (2013.01); *H01M 2220/20* (2013.01)

(58) Field of Classification Search
None
See application file for complete search history.

(56) References Cited

U.S. PATENT DOCUMENTS

| | | |
|---|---|---|
| 4,522,898 A | 6/1985 | Esrom |
| 4,865,929 A | 9/1989 | Eck |
| 8,703,317 B2 | 4/2014 | Tsumaki |
| 2007/0009787 A1* | 1/2007 | Straubel et al. ................. 429/99 |
| 2008/0220315 A1* | 9/2008 | Dougherty et al. ............. 429/53 |

(Continued)

FOREIGN PATENT DOCUMENTS

| | | |
|---|---|---|
| DE | 1 000 374 | 1/1957 |
| DE | 32 47 969 | 6/1984 |
| DE | 37 35 931 | 5/1989 |
| DE | 10 2009 035 465 | 2/2011 |

(Continued)

OTHER PUBLICATIONS

German Search Report of Jan. 7, 2013.

*Primary Examiner* — Patrick Ryan
*Assistant Examiner* — Christopher Domone
(74) *Attorney, Agent, or Firm* — Gerald E. Hespos; Michael J. Porco; Matthew T. Hespos

(57) ABSTRACT

A battery arrangement has a battery (10, 100, 200) having battery cells (11, 111, 211) with in each case two terminals (12, 112, 212) and a terminal plate (15, 115, 215), on which a terminal (12, 112, 212) of each battery cell (11, 111, 211) is arranged to connect the battery cells (11, 111, 211). A perforated plate (16, 216) is arranged above the terminal plate (15, 115, 215). A cooling medium is sprayed through the holes (17, 217) of the perforated plate (16, 216).

9 Claims, 3 Drawing Sheets

(56) References Cited

U.S. PATENT DOCUMENTS

2011/0305935 A1   12/2011  Yoon
2011/0318626 A1   12/2011  Bartenschlager
2012/0121949 A1    5/2012  Eberhard et al.

FOREIGN PATENT DOCUMENTS

| | | | |
|---|---|---|---|
| DE | 102009035465 | * | 2/2011 |
| DE | 20 2010 000 213 | | 9/2011 |
| DE | 10 2011 118 383 | | 5/2012 |

* cited by examiner

BATTERY ARRANGEMENT AND METHOD FOR COOLING A BATTERY

CROSS REFERENCE TO RELATED APPLICATION

This application claims priority under 35 USC 119 to German Patent Appl. No. 10 2012 111 970.8 filed on Dec. 7, 2012, the entire disclosure of which is incorporated herein by reference.

BACKGROUND

1. Field of the Invention

The invention relates to a battery arrangement and to a method for cooling a battery in a vehicle.

2. Description of the Related Art

A battery for use in motor vehicles, in particular in motor vehicles having a hybrid drive or in fuel cell vehicles, usually has a cell block comprising a plurality of battery cells or lithium ion cells that are connected electrically in series and/or in parallel. The battery cells have to be cooled to discharge waste heat that is produced during operation of the battery. The respective pole contacts, called terminals in the following text, of the individual battery cells usually are heated to a particularly pronounced extent during operation of the battery.

DE 10 2009 035 465 describes a cooling apparatus that is connected thermally to the battery cells to cool the battery cells. Head cooling arranges the cooling apparatus on a side of the battery cells on which the electric pole contacts of the individual cells are situated and connected to one another in pairs by cell connectors in an electrically conducting manner.

Indirect cooling by a cooling liquid uses an evaporating refrigerant, such as R134a or $CO_2$. Direct cooling uses a liquid that is temperature-controlled via a chiller of an air conditioning system and guides pre-cooled air between the individual cells.

DE 1 000 374 C1 discloses a thermally conducting plate arranged on a cell assembly of a battery. Cooling liquid flows through the thermally conducting plate.

DE 10 2009 035 465 A1 discloses a battery having a plurality of individual cells with cell connectors arranged on the pole side of the individual cells. The individual cells are connected electrically to one another by the cell connectors. Furthermore, the cell connectors are arranged a cell connector circuit board. A cooling channel structure is integrated into the cell connector circuit board and a thermally conducting medium can flow through the cooling channel structure. The cell connectors are connected to the cell connector circuit board in a thermally conducting manner. The individual cells of the battery can therefore be cooled via the cell connectors, via the cooling channel structure.

Against the background of the prior art, it is an object of the invention to provide an option of efficiently cooling the battery, its battery cells and the terminals of the battery cells without increased installation space.

SUMMARY OF THE INVENTION

The invention relates to a battery arrangement that comprises a battery with a plurality of battery cells, each of which has two pole contacts or terminals. The battery arrangement also has a terminal plate. One terminal of each of battery cell is arranged on the terminal plate in a positively locking and/or non-positive manner so that the battery cells are connected electrically to one another. A perforated plate is arranged above the terminal plate and a cooling medium is to be sprayed in through the holes of the perforated plate. The terminal plate can be a terminal sheet.

The perforated plate preferably is arranged above the terminal plate at a predefined spacing from the terminal plate. Spacer elements may be provided on the terminal plate to ensure the predefined spacing. The holes of the perforated plate preferably are arranged above regions of the terminal plate at which the respective terminals of the battery cells are arranged correspondingly below the terminal plate. The cooling medium sprayed into the holes then initially contacts regions of the terminal plate opposed to a terminal of a battery cell. As a result, the terminals of the battery cells are cooled primarily indirectly via the terminal plate.

The terminal plate may be riveted, soldered, welded, pressure welded and/or screwed to the respective terminal of each of the battery cells.

The perforated plate preferably is screwed to the terminal plate.

The cooling medium preferably is a dielectric cooling oil.

The terminal plate preferably has splash pots in a region below the holes of the perforated plate. The splash pots temporarily accommodate the cooling medium to be sprayed. As a result, the terminals arranged directly below the splash pots can be cooled to a more pronounced extent by the temporary accumulation of the cooling medium in the splash pots. Furthermore, the splash pots directly connect the terminals of the respective battery cells to the terminal plate.

The terminal plate preferably has holes in regions above intermediate spaces between the battery cells. The sprayed cooling medium can pass through the holes starting from the respective splash pots and then can flow along the outer faces in the direction of the respective longitudinal axes. As a result, inter-cell cooling is realized. The cooling medium first collects in the splash pots, but will run via their edges over the terminal plate when the splash pots are filled and then flow through the holes in the terminal plate.

The battery cells are arranged with their longitudinal axis parallel to one another.

The battery arrangement is coupled to a heat exchanger with a return line. The heat exchanger cools heated cooling medium and returns the cooling medium via the return line to make renewed spraying in of the cooled cooling medium through the holes of the perforated plate.

The heat exchanger preferably is arranged below the battery or the battery cells. As a result the cooling medium passes to the heat exchanger and is processed there only after running through the intermediate spaces between the battery cells.

The battery preferably is a vehicle battery, in particular a battery for a vehicle with a hybrid drive or for a fuel cell vehicle.

The battery arrangement enables the battery cells to be cooled and then discharges corresponding waste heat and therefore restricts or avoids an increase in an electric resistance in the battery cells. Furthermore, only a small installation space requirement for cooling of the battery. As a result, the cooling of the battery is improved and production and material costs are reduced. The battery arrangement of the invention ensures targeted cooling of those locations of the battery that are heated most by the waste heat and are therefore impaired, namely the terminals of the battery cells.

The advantages achieved by the battery arrangement of the invention include efficient, inexpensive simple cooling of the battery.

The invention also relates to a method for cooling a battery that has a plurality of battery cells, each of which has two terminals or pole contacts and a terminal plate. One terminal of each battery cell is arranged on the terminal plate in a positively locking and/or non-positive manner so that the battery cells are connected to one another electrically. A perforated plate is arranged above the terminal plate, and the method includes spraying a cooling medium through the holes of the perforated plate.

The cooling medium may be a dielectric cooling oil.

Splash pots preferably are provided in the terminal plate in a region below the holes of the perforated plate and temporarily accommodate the cooling medium.

Holes preferably are provided in the terminal plate in regions above intermediate spaces between the battery cells. The method includes passing the sprayed cooling medium through the holes and between the battery cells, starting from the respective splash pots, along their outer faces in the direction of their respective longitudinal axes.

The method of the invention furthermore uses a heat exchanger with a return line to cool and return coolant to make renewed spraying possible through the holes of the perforated plate.

Further advantages and refinements of the invention result from the description and the appended drawing. Features mentioned in above and explained in the following text can be used in the respectively specified combination and in other combinations or on their own, without departing from the scope of the invention.

The invention is shown diagrammatically in the drawings using embodiments and will be described in detail with reference to the drawings.

DETAILED DESCRIPTION OF THE PREFERRED EMBODIMENTS

Figure 1:
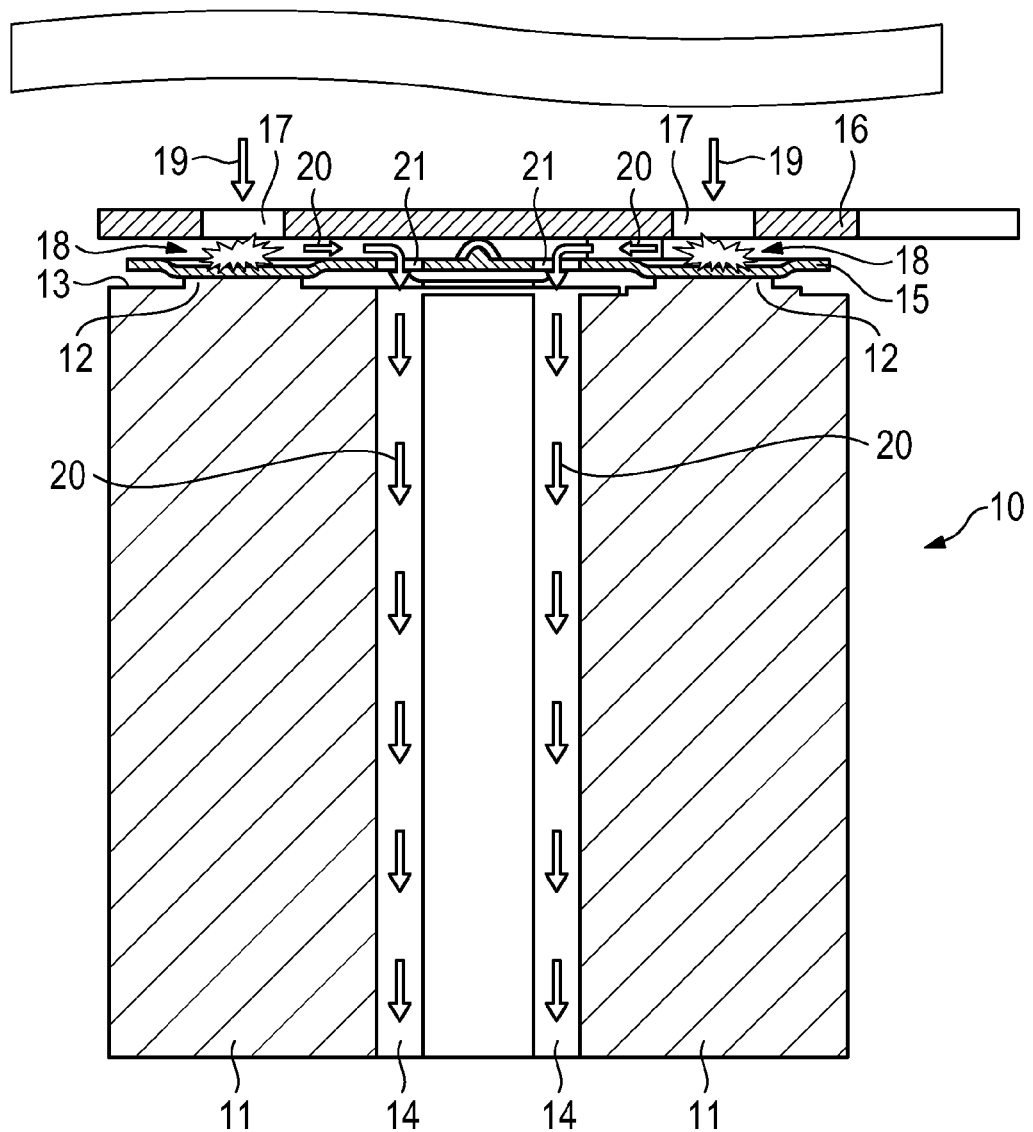
FIG. 1 is a diagrammatic illustration of one embodiment of a battery arrangement according to the invention.

FIG. 1 shows a diagrammatic illustration of a sectional view of one embodiment of a battery arrangement according to the invention.

The battery arrangement comprises a battery 10 having a plurality of battery cells 11. Each battery cell 11 has two terminals or pole contacts 12 and the terminals 12 situated on the upper side 13 of the battery 10 are shown in FIG. 1. The battery cells 11 are arranged parallel to one another along their respective longitudinal axes so that an intermediate space 14 exists between the adjacent battery cells 11. A terminal plate 15 is arranged above the battery 10, on which terminal plate 15, and one terminal 12 of each battery cell 11 is arranged in a positively locking and/or non-positive manner on the terminal plate 15. A perforated plate 16 is arranged above the terminal plate 15. The perforated plate 16 comprises holes 17 arranged in regions above the respective terminals 12 of the battery cells 11. Thus, a center axis that is positioned virtually through a respective hole of the perforated plate would intersect a central part of the terminal arranged underneath in each case. The terminal plate 15 has splash pots 18 in a respective region below the respective holes 17 of the perforated plate 16. The splash pots 18 temporarily accommodate coolant sprayed in through the holes 17 (as indicated by arrow 19) and also connect the terminals 12 of the respective battery cells 11 to the terminal plate 15. Coolant 19 sprayed through the holes 17 remains temporarily in the splash pots 18 and passes out of the splash pots 18 only when the splash pots 18 are filled with coolant to a certain degree, as indicated by arrows 20. The coolant then passes through holes 21 in the terminal plate, into the intermediate spaces 14 between the battery cells 11 and along outer sides of the battery cells 11 parallel to their longitudinal axes. As a result, both boosted cooling of the terminals via the splash pots 18 and inter-cell cooling are realized in a very simple way.

A heat exchanger (not shown here) can be provided below the battery 10 and cools the coolant that has passed through the intermediate spaces 14 and has been heated. The cooled coolant is sprayed again through the holes 17.

Figure 2:
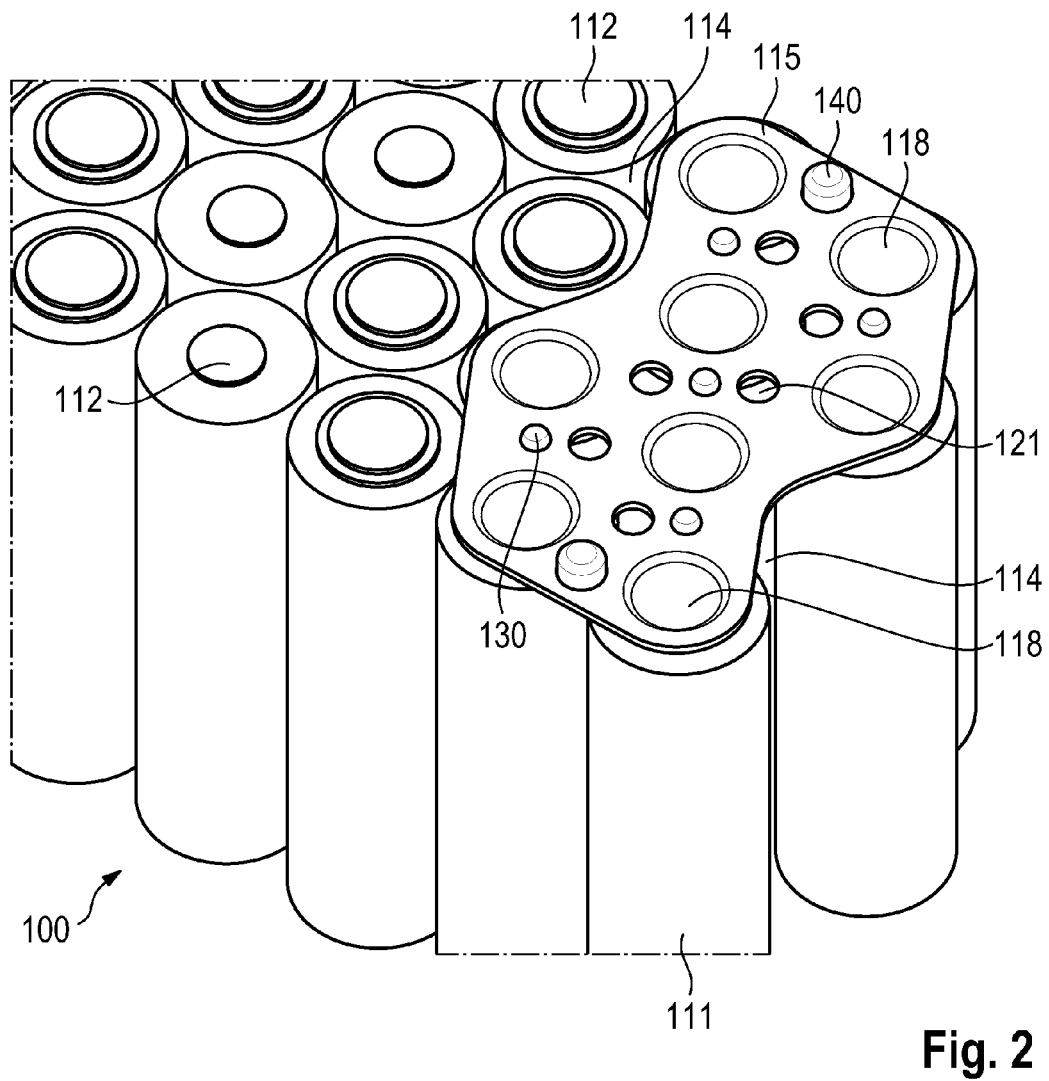
FIG. 2 is a diagrammatic illustration of a plan view of a battery having a plurality of battery cells and one embodiment of a terminal plate in a battery arrangement according to the invention.

FIG. 2 shows a plan view of a battery 100 having a plurality of battery cells 111, each of which has two terminals or pole contacts 112. The battery cells 111 are arranged parallel to one another along their respective longitudinal axes. A terminal plate 115 is provided for electrical connection of the battery cells 111 and has splash pots 118 above the respective terminals 112 of the battery cells 111. The splash pots 118 are recesses and temporarily accommodate coolant and provide direct connection of the terminals 112 to the terminal plate 115. Spacers 130 ensure that a perforated plate that is to be arranged above the terminal plate 115 (not shown) is held at a predefined spacing from the terminal plate 115. Furthermore, fasteners 140 fix the perforated plate (not shown) above the terminal plate 115. The terminal plate 115 has holes 121 arranged in regions above intermediate spaces 114 of the battery cells 111. As a result, the cooling medium that has remained in the splash pots 118 for a certain time can pass through the holes 121 between the battery cells 111 and can flow along the outer faces of the battery cells 111 in the direction of their respective longitudinal axes.

Figure 3:
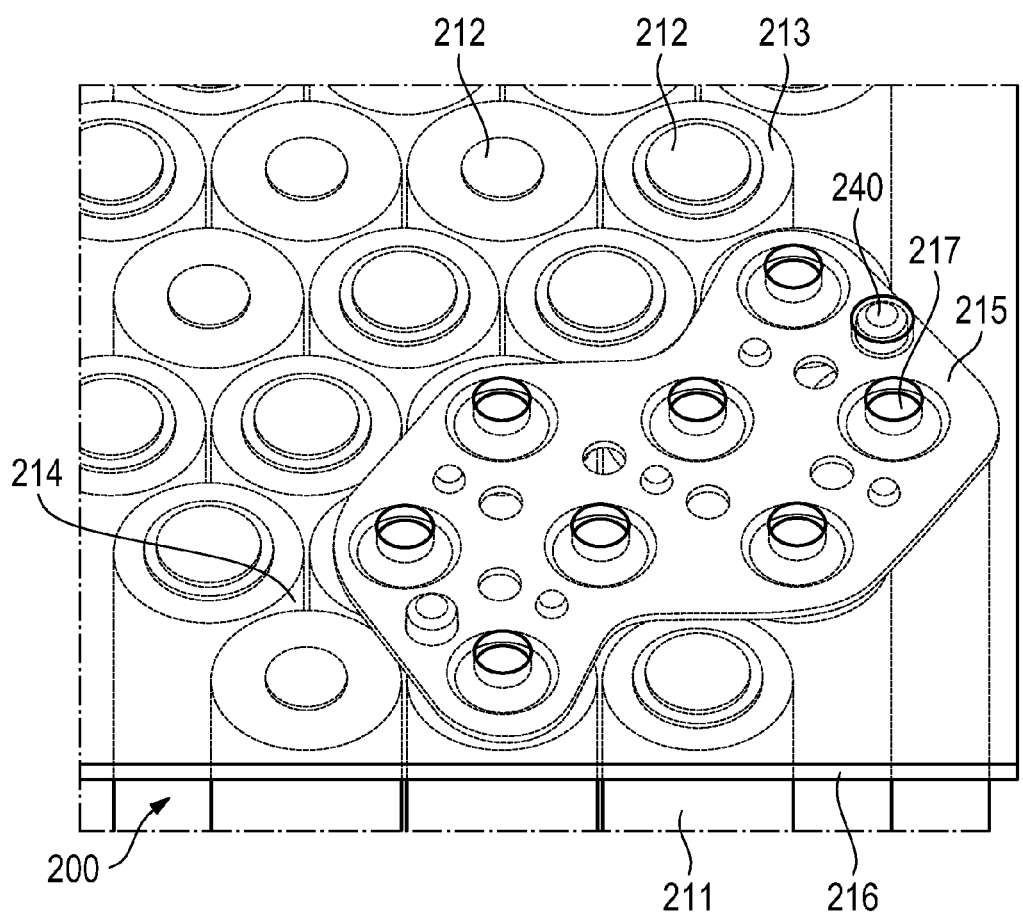
FIG. 3 is a diagrammatic illustration of a plan view of a further embodiment of a battery arrangement according to the invention.

FIG. 3 is a diagrammatic illustration of a further embodiment of a battery arrangement according to the invention. A battery 200 has battery cells 211 arranged parallel to one another. Each battery cell 211 has two pole contacts 212 with one pole contact 212 on the upper side 213 of the battery cell 211 shown in FIG. 3. Details of a terminal plate 215 arranged on the battery 200 and a perforated plate 216 arranged on the terminal plate 215 at a predefined spacing are shown. The holes 217 of the perforated plate 216 are arranged immediately above splash pots. As a result, a coolant that is sprayed in through the holes 217 is received first by the splash pots and remains there temporarily. As a result, the terminals arranged below the splash pots are cooled for a certain time by the coolant. The coolant then flows from the splash pots, along the terminal plate 215 and can pass through holes in the terminal plate 215, into intermediate spaces 214 between the battery cells 211, and flows there in the direction of their longitudinal axes along the outer faces of the battery cells 211 to cool the intermediate spaces 214 of the battery cells 211. A connection 240 between the perforated plate 216 and the terminal plate 215 also is shown.

What is claimed is:

1. A battery arrangement comprising:
    a battery having a plurality of battery cells arranged with spaces therebetween, each of the plurality of battery cells having an upper surface with a terminal arranged thereon;
    a terminal plate, arranged above the battery cells and having a plurality of upwardly facing concavities defining splash pots, each of the splash pots being connected respectively to the terminals of the battery cells, a plurality of terminal plate through holes formed in the terminal plate at locations spaced from the splash pots, the terminal plate through holes being aligned respectively with the spaces between the battery cells; and a perforated plate arranged above the terminal plate, the perforated plate having a plurality of perforated plate through holes aligned respectively with the splash pots, wherein a cooling medium sprayed into each of the plurality of perforated plate through holes is temporarily accommodated in the splash pots, and flows from the splash pots into the plurality of terminal plate through holes and down into the spaces between the battery cells.

2. The battery arrangement of claim 1, wherein the perforated plate is arranged above the terminal plate at a predefined spacing from the terminal plate.

3. The battery arrangement of claim 2, further comprising spacer elements arranged on the terminal plate for ensuring the predefined spacing.

4. The battery arrangement of claim 1, wherein a dielectric cooling oil is used as cooling medium to be sprayed in.

5. The battery arrangement of claim 1, further comprising a heat exchanger with a return line, the heat exchanger functioning to cool and return the cooling medium for renewed spraying through the holes of the perforated plate.

6. The battery arrangement of claim 1, wherein the battery is a vehicle battery for a vehicle with a hybrid drive or a fuel cell vehicle.

7. The battery arrangement of claim 1, wherein the terminal plate is riveted, soldered, welded, pressure welded or screwed to the respective terminal of each of the battery cells.

8. The battery arrangement of claim 1, wherein the perforated plate is screwed to the terminal plate.

9. The battery arrangement of claim 1, wherein the battery cells are arranged with their longitudinal axis parallel to one another.

* * * * *